No. 736,252. PATENTED AUG. 11, 1903.
C. HERING.
TRANSPLANTER.
APPLICATION FILED MAY 6, 1903.
NO MODEL.

Witnesses
Chas. K. Davies.
M. E. Moore

Charles Hering
Inventor by
Attorney

No. 736,252.                                          Patented August 11, 1903.

UNITED STATES PATENT OFFICE.

CHARLES HERING, OF BUSHNELL, ILLINOIS, ASSIGNOR OF ONE-HALF TO CLYDE W. HERING, OF BUSHNELL, ILLINOIS.

TRANSPLANTER.

SPECIFICATION forming part of Letters Patent No. 736,252, dated August 11, 1903.

Application filed May 6, 1903. Serial No. 155,856. (No model.)

*To all whom it may concern:*

Be it known that I, CHARLES HERING, a citizen of the United States, residing at Bushnell, in the county of McDonough and State of Illinois, have invented certain new and useful Improvements in Transplanters, of which the following is a specification.

My invention relates to improvements in transplanters; and the object of my invention is the provision of a simple and inexpensive device by means of which the plants may be set out in rows and at the exact and proper distance apart to insure a perfect growth of the plant and which will permit the plants to be handled in a rapid manner, thus insuring a saving of time and expense and the proper planting to produce strong and healthy plants.

With this object in view my invention consists of a transplanting device embodying novel features of construction and combination of parts, substantially as disclosed herein.

Figure 1:
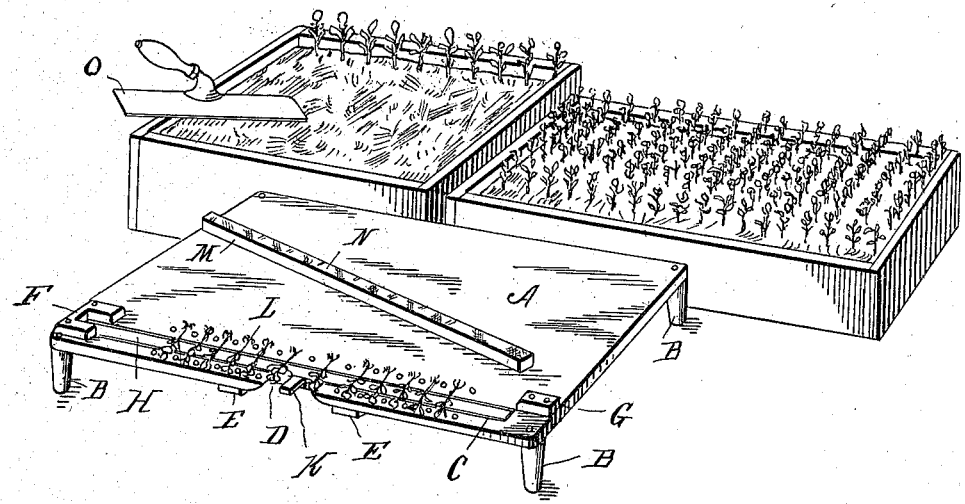
Figure 3:
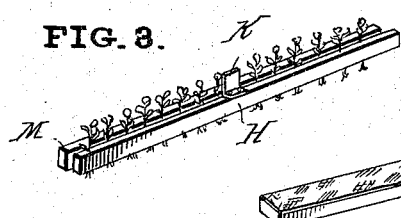
Figure 4:
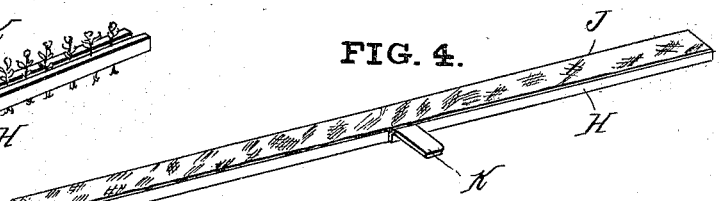
Figure 2:
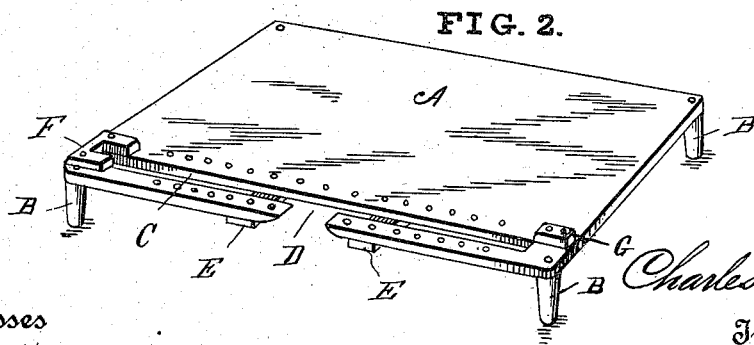

Figure 1 represents a perspective view of my transplanter with plants in position to be handled and also showing boxes with the plants as they appear when transplanted with my device for the purpose of illustrating its use. Fig. 2 represents a perspective view of the table or platform which I use. Fig. 3 represents a perspective view of the lifting or transplanting bars, showing a number of plants in position to be placed in the ground to show how I move or handle the young plants; and Fig. 4 is a perspective view of one of the lifting or transplanting bars.

In the drawings the letter A designates a table or platform mounted upon four legs or supports B, which table is provided at its forward edge with a slot or channel C, having a mouth or passage D, adjacent to which mouth and on the under side are the transverse supports E, and at one end of the slot is formed the keeper F and at the other end the guide-block G. Within said slot fits the lower bar H, which is preferably provided with a covering J, of soft material, to prevent injury to the plant, and the bar is further provided with a handle K, which normally rests in the transverse opening to said slot, and in use the young plants L rest upon the bar H and are secured thereon by the upper bar M, also covered with a suitable soft covering N to protect the plants. In this way the plants are held in proper position with their roots projecting the proper distance, and they are placed in a ditch made in the earth by a suitable implement O and are covered with earth, and when the bars are removed the plants are arranged at the proper distance apart and at the necessary depth in the earth to insure a perfect growth.

It will be seen that the guide and keeper are at each end of the slot in the table and that they serve to receive the upper bar and cause the same to rest upon the row of plants, so that the two bars will evenly lift the entire row of plants.

I claim—

1. A transplanter consisting of a table, a removable supporting-bar fitting in the table and upon which a row of the plants rest and a similar bar to engage the plants and enable them to be transplanted between said bars.

2. A transplanter consisting of a table having a slot therein, a lower lifting-bar fitting in said slot upon which the plants rest, and an upper lifting-bar to engage the plants and enable them to be transplanted in rows.

3. A transplanter consisting of a table having a slot, supporting-bars adjacent to the slot, a guide and keeper at the ends of said slot, a lifting-bar having a handle and fitting in the slot of the table, and a twin lifting-bar between which and the lower bar the plants are held and carried.

In testimony whereof I affix my signature in presence of two witnesses.

CHARLES HERING.

Witnesses:
    F. M. WILLIAMS,
    G. F. HALL.